3,256,286
3 - HYDROXY - 6 - OXO - N - LOWER ALKYLMOR-
PHINANS AND 3 - LOWER ALKOXY - 4 - ARYL-
OXY - 6β - HYDROXY - N - LOWER ALKYLMOR-
PHINANS
Yoshiro Sawa and Shin Maeda, Hyogo Prefecture, and
Naoki Tsuzi, Osaka Prefecture, Japan, assignors to
Shionogi & Co. Ltd., Osaka, Japan
No Drawing. Filed Apr. 4, 1963, Ser. No. 270,554
Claims priority, application Japan, Apr. 9, 1962,
37/14,252
4 Claims. (Cl. 260—285)

The present invention relates to a process for hydrogenation of morphinan derivatives and products thereby.

In the term "morphinan" herein employed, there are included all the compounds having a fundamental structure representable by the following plane formula:

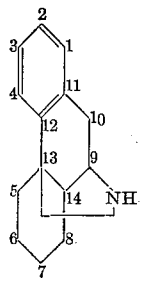

Accordingly, the term "morphinan" means not only normal morphinan (cis-1,3,4,9,10,10a-hexahydro-2H-10,4a-iminoethanophenanthrene) but also isomorphinan (trans-1,3,4,9,10,10a - hexahydro - 2H - 10,4a - iminoethanophenanthrene), inclusively. When distinction is necessary, normal morphinan and isomorphinan will be hereinafter designated as "morphinan (cis)" and "morphinan (trans)", respectively. The position-numbering hereinafter employed for the morphinan derivatives is that generally accepted in morphinan chemistry as shown in the above plane formula.

The hydrogenation process of the present invention is illustratively representable by the following formulae:

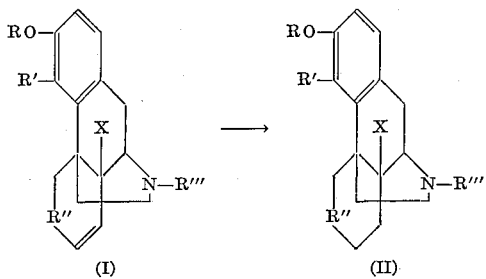

wherein R represents a hydrogen atom, a lower alkanoyl group (e.g. acetyl, propionyl, butyryl) or a lower alkyl group (e.g. methyl, ethyl, propyl), R' represents a hydrogen atom, an aryloxy group (e.g. phenyloxy, naphthyloxy) or a substituted aryloxy group (e.g. substituted phenyloxy, substituted naphthyloxy) wherein the substituent is lower alkyl (e.g. methyl, ethyl, propyl), lower alkoxy (e.g. methoxy, ethoxy, propoxy), nitro or amino, R" represents a hydroxymethylene group, a lower alkanoyloxymethylene group (e.g. acetyloxymethylene, propionyloxymethylene, butyryloxymethylene), a carbonyl group or a ketalated carbonyl group (e.g. ethylene-
dioxymethylene, diethoxymethylene), R''' represents a lower alkyl group (e.g. methyl, ethyl, propyl) or an ar(lower) alkyl group (e.g. benzyl, phenethyl) and X represents a hydrogen atom, a hydroxyl group or a lower alkanoyloxy group (e.g. acetyloxy, propionyloxy, butyryloxy).

As the starting material, there may be used the optically active or racemic $\Delta^7$-morphinan of Formula I. Specific examples of the $\Delta^7$-morphinan (I) include 3-hydroxy-6-oxo-N-methyl-$\Delta^7$-morphinan,
3-acetyloxy-6-oxo-N-methyl-$\Delta^7$-morphinan,
3,6α-dihydroxy-N-methyl-$\Delta^7$-morphinan,
3-hydroxy-6α-acetyloxy-N-methyl-$\Delta^7$-morphinan,
3,6α-diacetyloxy-N-methyl-$\Delta^7$-morphinan,
3,6β-dihydroxy-N-methyl-$\Delta^7$-morphinan,
3-hydroxy-4-phenyloxy-6-oxo-N-methyl-$\Delta^7$-morphinan,
3-acetyloxy-4-phenyloxy-6-oxo-N-methyl-$\Delta^7$-morphinan,
3-propionyloxy-4-phenyloxy-6-oxo-N-methyl-$\Delta^7$-morphinan,
3-hydroxy-4-p-nitrophenyloxy-6-oxo-N-methyl-$\Delta^7$-morphinan,
3,6α-dihydroxy-4-phenyloxy-N-methyl-$\Delta^7$-morphinan,
3,6β-dihydroxy-4-p-methoxyphenyloxy-N-methyl-$\Delta^7$-morphinan,
3-methoxy-6-oxo-N-methyl-$\Delta^7$-morphinan,
3-ethoxy-6-oxo-N-methyl-$\Delta^7$-morphinan,
3-methoxy-6α-hydroxy-N-methyl-$\Delta^7$-morphinan,
3-methoxy-6β-hydroxy-N-methyl-$\Delta^7$-morphinan,
3-methoxy-6β-acetyloxy-N-methyl-$\Delta^7$-morphinan,
3-methoxy-4-phenyloxy-6-oxo-N-methyl-$\Delta^7$-morphinan,
3-methoxy-4-phenyloxy-6α-hydroxy-N-methyl-$\Delta^7$-morphinan,
3-methoxy-4-phenyloxy-6β-hydroxy-N-methyl-$\Delta^7$-morphinan,
3,14-dihydroxy-6-oxo-N-methyl-$\Delta^7$-morphinan,
3-hydroxy-6-oxo-N-ethyl-$\Delta^7$-morphinan,
3-hydroxy-6-oxo-N-phenethyl-$\Delta^7$-morphinan,
3,6α,14-trihydroxy-N-methyl-$\Delta^7$-morphinan,
3-methoxy-6-oxo-14-hydroxy-N-methyl-$\Delta^7$-morphinan,
3-methoxy-6-oxo-14-acetyloxy-N-methyl-$\Delta^7$-morphinan,
3-methoxy-6-oxo-14-acetyloxy-N-phenethyl-$\Delta^7$-morphinan,
3-methoxy-4-phenyloxy-6α,14-dihydroxy-N-methyl-$\Delta^7$-morphinan,
3-methoxy-4-phenyloxy-6α,14-diacetyloxy-N-methyl-$\Delta^7$-morphinan, etc.

According to the process of the present invention, the starting $\Delta^7$-morphinan (I) is subjected to hydrogenation to produce the morphinan of Formula II. Although various conventional hydrogenation procedures can be adopted for attaining the object, the application of catalytic hydrogenation is preferred. For instance, the hydrogenation reaction may be effected by treating the $\Delta^7$-morphinan (I) with hydrogen in the presence of a catalyst such as platinum catalyst (e.g. platinum, platinum dioxide, platinum black, platinum-carbon), palladium catalyst (e.g. palladium, palladium monoxide, palladium black, palladium carbon, palladium-strontium carbonate, palladium-barium sulfate) and nickel catalyst (e.g. Raney nickel, Urushibara nickel) in an inert solvent medium (e.g. water, methanol, ethanol, ether, tetrahydrofuran, dioxane, benzene, acetic acid), usually at room temperature (15 to 30° C.) under atmospheric pressure.

The morphinan (II) occurs in optically active form as well as in racemic mixture and these are all within the scope of the present invention. Specific examples of the morphinan (II) include 3-hydroxy-6-oxo-N-methylmorphinan,
3-acetyloxy-6-oxo-N-methylmorphinan, 3,6α-dihydroxy-N-methylmorphinan,
3-hydroxy-6α-acetyloxy-N-methylmorphinan,
3,6α-diacetyloxy-N-methylmorphinan,
3,6β-dihydroxy-N-methylmorphinan,
3-hydroxy-4-phenyloxy-6-oxo-N-methylmorphinan,
3-acetyloxy-4-phenyloxy-6-oxo-N-methylmorphinan,
3-propionyloxy-4-phenyloxy-6-oxo-N-methylmorphinan,
3-hydroxy-4-p-nitrophenyloxy-6-oxo-N-methylmorphinan,
3,6α-dihydroxy-4-phenyloxy-N-methylmorphinan,
3,6β-dihydroxy-4-p-methoxyphenyloxy-N-methylmorphinan,
3-methoxy-6-oxo-N-methylmorphinan,
3-ethoxy-6-oxo-N-methylmorphinan,
3-methoxy-6α-hydroxy-N-methylmorphinan,
3-methoxy-6β-hydroxy-N-methylmorphinan,
3-methoxy-6β-acetyloxy-N-methylmorphinan,
3-methoxy-4-phenyloxy-6-oxo-N-methylmorphinan,
3-methoxy-4-phenyloxy-6α-hydroxy-N-methylmorphinan,
3-methoxy-4-phenyloxy-6β-hydroxy-N-methylmorphinan,
3,14-dihydroxy-6-oxo-N-methylmorphinan,
3-hydroxy-6-oxo-N-ethylmorphinan,
3-hydroxy-6-oxo-N-phenethylmorphinan,
3,6α,14-trihydroxy-N-methylmorphinan,
3-methoxy-6-oxo-14-hydroxy-N-methylmorphinan,
3-methoxy-6-oxo-14-acetyloxy-N-methylmorphinan,
3-methoxy-6-oxo-14-acetyloxy-N-phenethylmorphinan,
3-methoxy-4-phenyloxy-6α,14-dihydroxy-N-methylmorphinan,
3-methoxy-4-phenyloxy-6α,14-diacetyloxy-N-methylmorphinan, etc.

The morphinan (II) forms acid addition salts with organic and inorganic acids. Illustrative acid addition salts include the hydrohalide (e.g. hydrochloride, hydrobromide, hydroiodide), sulfate, phosphate, nitrate, tartrate, salicylate, benzoate, malate, citrate, acetate, etc.

The morphinan (II) and acid addition salts thereof exhibit various pharmacological activity such as analgesic activity, antitussive activity and antiinflammatory activity. For instance, the analgesic activity and toxicity of some morphinan compounds according to the present invention are shown in the following Table I:

TABLE I

| Compound | Analgesic activity | | Toxicity (LD$_{50}$, mg./kg.) |
|---|---|---|---|
| | Haffner-Hesse method | D'Amour-Smith method | |
| (−)-3-methoxy-6-oxo-N-methylmorphinan (cis) hydrochloride | 2.7 | 1.5 | 54.02 |
| (−)-3-hydroxy-6-oxo-N-methylmorphinan (cis) tartrate | 1.8 | 1.2 | 86.13 |
| (−)-3-methoxy-6β-acetyloxy-N-methylmorphinan (cis) | 1.0 | 1.6 | 6.95 |
| (−)-3,6β-diacetyloxy-N-methylmorphinan (cis) | 1.4 | 11.0 | 91.76 |
| (−)-3-methoxy-6-oxo-14-hydroxy-N-methylmorphinan (cis) | 4.0 | 6.0 | 76.77 |
| (−)-3-methoxy-6-oxo-14-acetyloxy-N-methylmorphinan (cis) hydrochloride | 3.4 | 29.9 | >1,000 |
| (−)-3,14-dihydroxy-6-oxo-N-methylmorphinan (cis) | 5.4 | 16.5 | 150.20 |
| (−)-3-methoxy-6-oxo-14-hydroxy-N-phenethylmorphinan (cis) | 5.7 | 10.3 | >1,000 |
| (−)-3,14-dihydroxy-6-oxo-N-phenethylmorphinan (cis) | 9.4 | 43.7 | 1,000 |

NOTE: The analgesic activity was observed by the Haffner-Hesse method [Hesse: Arch. exp. Path. u. Pharm., Vol. 158, p. 233 (1930)] in mice and the D'Amour-Smith method [D'Amour et al.: J. Pharmacol., Vol. 1, p. 255 (1946)] in rats and is shown as the effective ratio to morphine, the value of which is expressed as 1. The toxicity was tested by administering intravenously the tested compound to mice.

Further, for instance, the antitussive activity and toxicity of some morphinan compounds according to the present invention are shown in the following Table II:

TABLE II

| Compound | Antitussive activity | Toxicity (LD$_{50}$, mg./kg.) |
|---|---|---|
| (−)-3-methoxy-6β-hydroxy-N-methylmorphinan (cis) | 2.0 | 82.51 |
| (−)-3-methoxy-6β-acetyloxy-N-methylmorphinan (cis) | 5.0 | 6.95 |
| (−)-3-methoxy-6α-acetyloxy-N-methylmorphinan (cis) | 2.7 | 37.74 |
| (−)-3-hydroxy-6-oxo-N-methylmorphinan (cis) tartrate | 2.9 | 86.13 |
| (−)-3,6α-dihydroxy-N-methylmorphinan (cis) acetate | 1.4 | 172.36 |
| (−)-3-hydroxy-6α-acetyloxy-N-methylmorphinan (cis) | 1.9 | 73.55 |
| (−)-3,6α-diacetyloxy-N-methylmorphinan (cis) | 5.2 | 45.12 |
| (−)-3,6β-diacetyloxy-N-methylmorphinan (cis) | 2.9 | 91.76 |
| (−)-3-methoxy-6β-acetyloxy-14-hydroxy-N-methylmorphinan (cis) | 2.8 | 45.20 |
| (−)-3-methoxy-6β,14-diacetyloxy-N-methylmorphinan (cis) | 3.4 | 72.11 |
| (−)-3-methoxy-6α,14-diacetyloxy-N-methylmorphinan (cis) | 1.6 | 74.02 |
| (−)-3-methoxy-6-oxo-14-hydroxy-N-methylmorphinan (cis) | 16.0 | 76.77 |
| (−)-3,14-dihydroxy-6-oxo-N-methylmorphinan (cis) | 6.8 | 150.20 |

NOTE: The antitussive activity was observed by the Winter method [Winter et al.: J. Exper. Med., Vol. 101, p. 17 (1955)] in guinea pigs and is shown as the effective ratio to codeine, the value of which is expressed as 1. The toxicity was tested by administering intravenously the tested compound to mice.

Accordingly, they are useful as analgesic and/or antitussive agents.

Practical and presently preferred embodiments of the present invention are illustrated by the following examples. In the examples, mg.=milligram(s), g.=gram(s), ml.=millilitre(s) and °C.=degrees centigrade. Other abbreviations have conventional meanings.

EXAMPLE 1

Preparation of (−)-3-methoxy-6-oxo-N-methylmorphinan(cis)

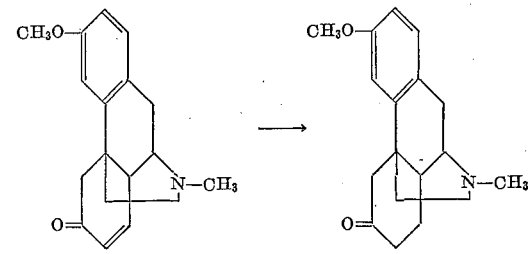

To a solution of (−)-3-methoxy-6-oxo-N-methyl-Δ$^7$-morphinan(cis) (290 mg.) in methanol (5 ml.), there is added palladium-carbon prepared from palladium chloride (100 mg.), activated carbon (200 mg.) and 5% hydrochloric acid (2 ml.), and the resultant mixture is shaken at room temperature (15 to 30° C.) in hydrogen stream. After absorption of hydrogen (1.4 molar equivalent), the reaction mixture is filtered to separate the catalyst and distilled to remove ethanol. The residue is crystallized from ethanol to give (−)-3-methoxy-6-oxo-N-methylmorphinan(cis) (147 mg.) as crystals melting at 187 to 188° C. $[\alpha]_D^{29}$ −95.3° (ethanol).

Anal.—Calcd. for $C_{18}H_{23}O_2N$: C, 75.76; H, 8.12; N, 4.91. Found: C, 75.82; H, 8.19; N, 4.81.

The starting material of this example, (−)-3-methoxy-6-oxo-N-methyl-Δ$^7$-morphinan(cis), is prepared from (−)-3,6-dimethoxy-N-methyl-Δ$^{5,8}$-morphinan(cis) [Sawa et al.: Tetrahedron, Vol. 15, p. 154 (1961)] according to the following scheme:

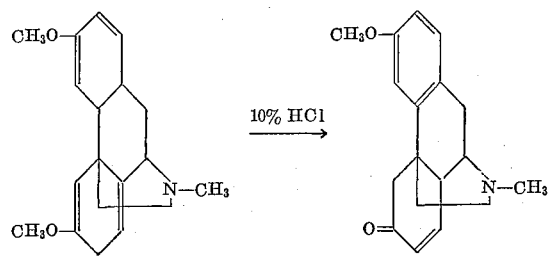

EXAMPLE 2

*Preparation of (—)-3-hydroxy-6-oxo-N-methylmorphinan(cis)*

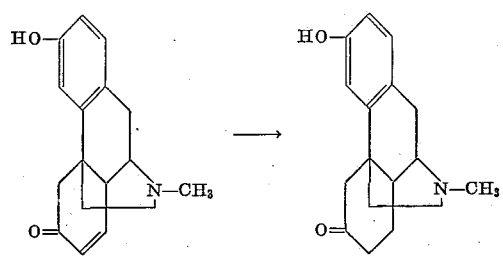

(—)-3-hydroxy-6-oxo-N-methyl-$\Delta^7$-morphinan(cis) (60 mg.) is subjected to hydrogenation using palladium carbon as in Example 1 whereby there is obtained (—)-3-hydroxy-6-oxo-N-methylmorphinan(cis) (60 mg.) as crystals melting at 227 to 228° C. (crystallized from tert. amyl alcohol). $[\alpha]_D^{29}$ —101.5° (ethanol).

*Anal.*—Calcd. for $C_{17}H_{21}O_2N \cdot C_5H_{12}O$: C, 73.50; H, 9.25; N, 3.90. Found: C, 73.57; H, 9.32; N, 3.81.

The starting material of this example, (—)-3-hydroxy-6-oxo-N-methyl-$\Delta^7$-morphinan(cis), is prepared from (—)-3-methoxy-6-oxo-N-methyl-$\Delta^7$-morphinan(cis) [cf. Example 1 of this specification] according to the following scheme:

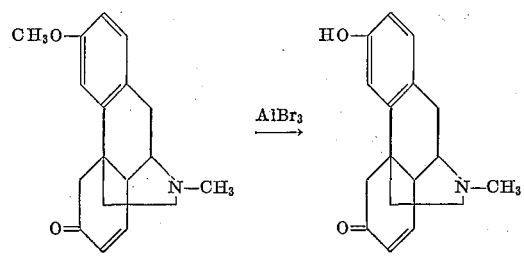

EXAMPLE 3

*Preparation of (—)-3-methoxy-6-oxo-N-methylmorphinan (trans)*

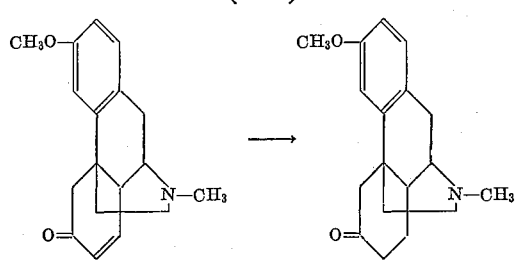

(+)-3-methoxy-6-oxo-N-methyl-$\Delta^7$-morphinan(trans) (300 mg.) is subjected to hydrogenation using palladium carbon as in Example 1 whereby there is obtained (—)-3-methoxy-6-oxo-N-methylmorphinan(trans) (301 mg.) as a solid melting at 88 to 89° C. The solid is treated with picric acid in ethanol and crystallized from ethanol to give (—)-3-methoxy-6-oxo-N-methylmorphinan(trans) picrate as crystals melting at 236° C. $[\alpha]_D^{22.5°}$ —81.4±2° (ethanol).

*Anal.*—Calcd. for $C_{18}H_{23}O_2N \cdot C_6H_3O_7N_3$: C, 56.03; H, 5.09; N, 10.89. Found: C, 56.15; H, 5.28; N, 10.75.

The starting material of this example, (+)-3-methoxy-6-oxo-N-methyl-$\Delta^7$-morphinan(trans), is prepared from (—)-3,6-dimethoxy-N-methyl-$\Delta^{5,8}$-morphinan(cis) [Sawa et al.: Tetrahedron, vol. 15, p. 154 (1961)] according to the following scheme:

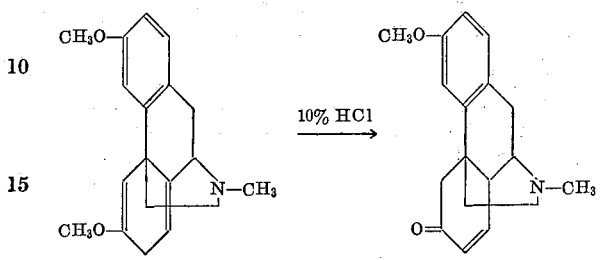

EXAMPLE 4

*Preparation of (—)-3-methoxy-6α-hydroxy-N-methylmorphinan(cis)*

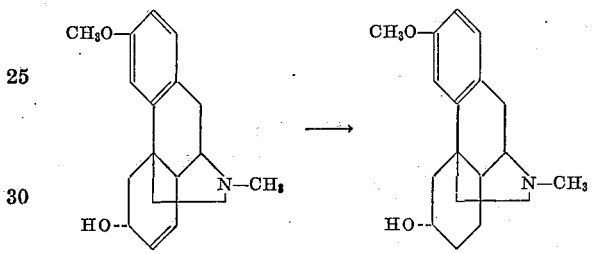

To a solution of (+)-3-methoxy-6α-hydroxy-N-methyl-$\Delta^7$-morphinan(cis) (50 mg.) in 99% ethanol (1 ml.), there is added 5% palladium-strontium carbonate (30 mg.), and the resulting mixture is shaken at room temperature (15 to 30° C.) in hydrogen stream. After absorption of the theoretical amount of hydrogen, the reaction mixture is filtered to remove the catalyst and distilled to remove ethanol. The residue is crystallized from ethyl acetate to give (—)-3-methoxy-6α-hydroxy-N-methylmorphinan(cis) (48 mg.) as crystals melting at 133.5 to 134° C. $[\alpha]_D^{32}$ —31.3° (ethanol).

*Anal.*—Calcd. for $C_{18}H_{25}O_2N$: C, 75.22; H, 8.77; N, 4.87. Found: C, 75.22; H, 8.73; N, 4.95.

The starting material of this example, (+)-3-methoxy-6α-hydroxy-N-methyl-$\Delta^7$-morphinan(cis), is prepared from (—)-3-methoxy-6-oxo-N-methyl-$\Delta^7$-morphinan(cis) [cf. Example 1 of this specification] according to the following scheme:

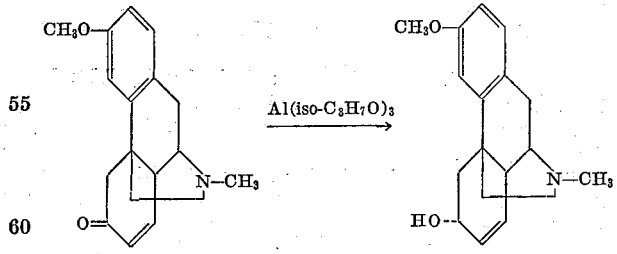

EXAMPLE 5

*Preparation of (—)-3-methoxy-6β-hydroxy-N-methylmorphinan(cis)*

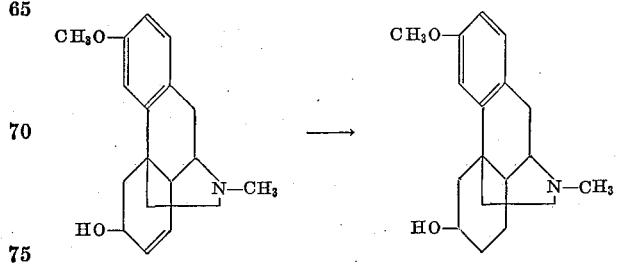

(—) - 3-methoxy-6β-hydroxy-N-methyl-Δ⁷-morphinan (cis) (50 mg.) is subjected to hydrogenation using 5% palladium-strontium carbonate as in Example 4 whereby there is obtained (—)-3-methoxy-6β-hydroxy-N-methyl-morphinan(cis) (48 mg.) as crystals melting at 208 to 209° C. (crystallized from ethyl acetate). $[\alpha]_D^{24}$ —71.6° (ethanol).

*Anal.*—Calcd. for $C_{18}H_{25}O_2N$: C, 75.22; H, 8.77; N, 4.87. Found: C, 75.05; H, 8.80; N, 4.69.

The starting material of this example, (—)-3-methoxy-6β-hydroxy-N-methyl-Δ⁷-morphinan(cis), is prepared from (—)-3-methoxy-6-oxo-N-methyl-Δ⁷-morphinan(cis) [cf. Example 1 of this specification] according to the following scheme:

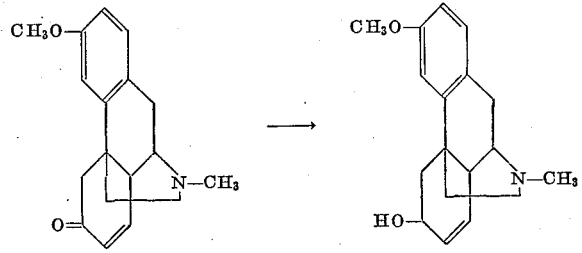

EXAMPLE 6

*Preparation of (—)-3-methoxy-4-phenyloxy-6-oxo-N-methylmorphinan(trans)*

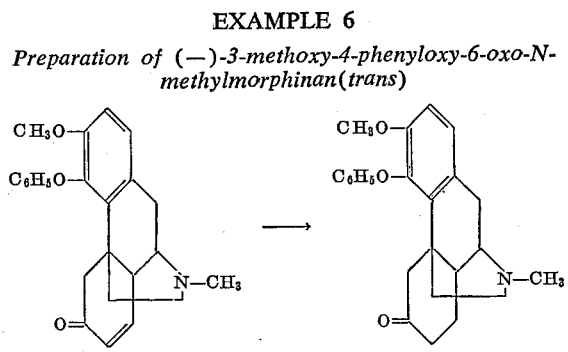

To a solution of (+)-3-methoxy-4-phenyloxy-6-oxo-N-methyl-Δ⁷-morphinan(trans) (3.75 g.) in ethanol (100 ml.), there is added platinum dioxide (50 mg.), and the resultant mixture is shaken at room temperature (15 to 30° C.) in hydrogen stream. After absorption of hydrogen (250 ml.) in 2 hours, the reaction mixture is filtered to separate the catalyst and distilled to remove ethanol. The residue is crystallized from ethanol to give (—)-3-methoxy - 4-phenyloxy-6-oxo-N-methylmorphinan(trans) (3.50 g.) as crystals melting at 156° C. $[\alpha]_D^{31}$ —41.0° (chloroform).

*Anal.*—Calcd. for $C_{24}H_{27}O_3N$: C, 76.36; H, 7.21; N, 3.71. Found: C, 76.30; H, 7.28; N, 3.75.

*The methiodide.*—M.P., 227 to 228° C. (crystallized from acetone).

The starting material of this example, (+)-3-methoxy-4-phenyloxy-6-oxo-N-methyl-Δ⁷-morphinan(trans), is prepared from (+)-3,6-dimethoxy-4-phenyloxy-N-methyl-Δ⁵,⁸-morphinan(cis) [Sawa et al.: Tetrahedron, vol. 15, p. 164 (1961)] according to the following scheme:

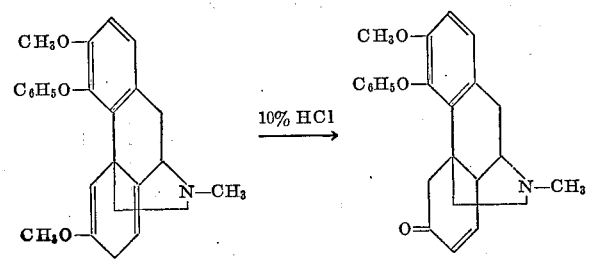

EXAMPLE 7

*Preparation of (—)-3-methoxy-6α-hydroxy-N-methylmorphinan(trans)*

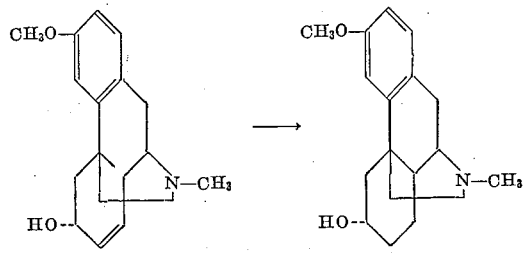

(—)-3-methoxy-6α-hydroxy - N - methyl-Δ⁷-morphinan (trans) is subjected to hydrogenation using platinum dioxide as in Example 6 whereby there is quantitatively obtained (—)-3-methoxy - 6α-hydroxy-N-methylmorphinan (trans) as crystals melting at 126° C. (crystallized from a mixture of methanol and water (1:1)). $[\alpha]_D^{28}$ —58.8° (chloroform).

*Anal.*—Calcd. for $C_{18}H_{25}O_2N$: C, 75.22; H, 8.77; N, 4.87. Found: C, 74.97; H, 8.84; N, 4.56.

The starting material of this example, (—)-3-methoxy-6α-hydroxy - N - methylmorphinan(trans), is prepared from (+)-3-methoxy-6-oxo-N - methyl - Δ⁷ - morphinan (trans) [cf. Example 3 of this specification] according to the following scheme:

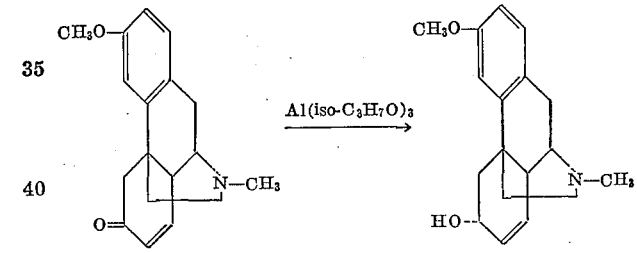

EXAMPLE 8

*Preparation of (—)-3-methoxy-6β-hydroxy-N-methylmorphinan(trans)*

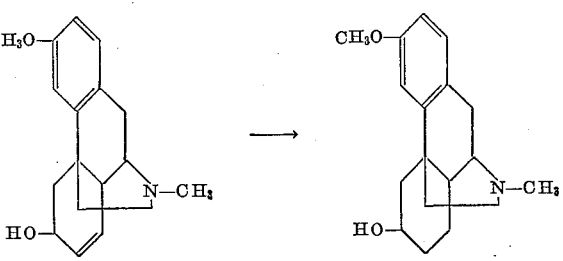

(—)-3-methoxy-6β-hydroxy-N-methyl - Δ⁷ - morphinan (trans) is subjected to hydrogenation using platinum dioxide as in Example 6 whereby there is obtained (—)-3-methoxy-6β-hydroxy-N-methylmorphinan(trans) as an oil. $[\alpha]_D^{31}$ —46.7° (chloroform). The oil is treated with picric acid in ethanol and crystallized from a mixture of ether and ethanol (1:1) to give (—)-3-methoxy-6β-hydroxy-N-methylmorphinan(trans)picrate as crystals melting at 210 to 212° C. (decomp.).

*Anal.*—Calcd. for $C_{18}H_{25}O_2N \cdot C_6H_3O_7N_3$: C, 55.81; H, 5.46; N, 10.85. Found: C, 55.75; H, 5.79; N, 10.84.

The starting material of this example, (—)-3-methoxy-6β-hydroxy-N-methyl-Δ⁷-morphinan(trans), is prepared from (+) - 3 - methoxy - 6 - oxo-N-methyl-Δ⁷-morphina (trans) [cf. Example 3 of this specification] according to the following scheme:

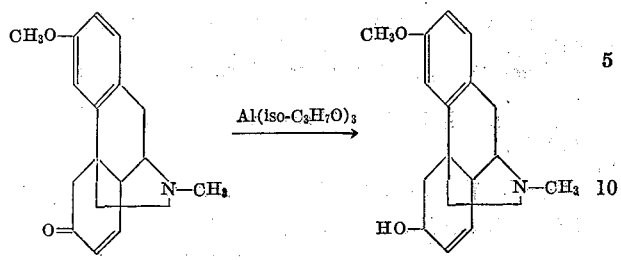

EXAMPLE 9

*Preparation of (+)-3-methoxy-4-phenyloxy-6α-hydroxy-N-methylmorphinan(cis)*

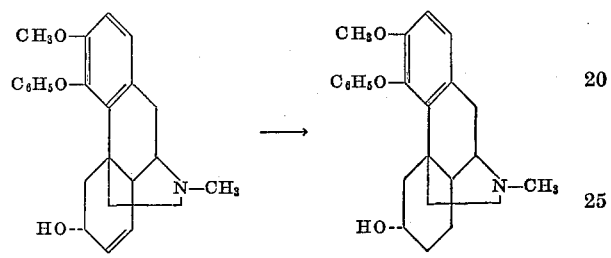

(+)-3-methoxy-4-phenyloxy-6α-hydroxy - N - methyl-Δ⁷-morphinan(cis) hydrochloride hemihydrate (423 mg.) is subjetced to hydrogenation using platium dioxide as in Example 6 whereby there is obtained (+)-3-methoxy-4-phenyloxy-6α-hydroxy - N - methylmorphinan(cis) (192 mg.) as crystals melting at 106 to 107° C. (crystallized from ether).

The starting material of this example, (+)-3-methoxy-4-phenyloxy-6α-hydroxy-N-methyl - Δ⁷ - morphinan(cis), is prepared from (+)-3,6-dimethoxy-4-phenyloxy-N-methyl-Δ⁵,⁸-morphinan(cis) [Sawa et al.: Tetradedron, vol. 15, p. 154 (1961)] according to the following scheme:

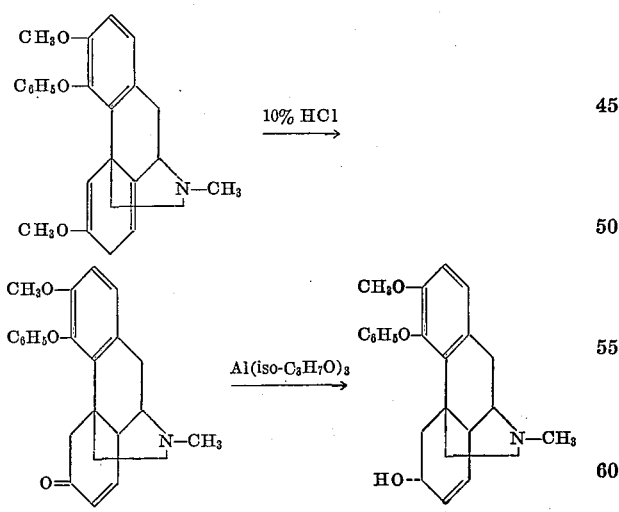

EXAMPLE 10

*Preparation of (—)-3-methoxy-4-phenyloxy-6β-hydroxy-N-methylmorphinan(cis)*

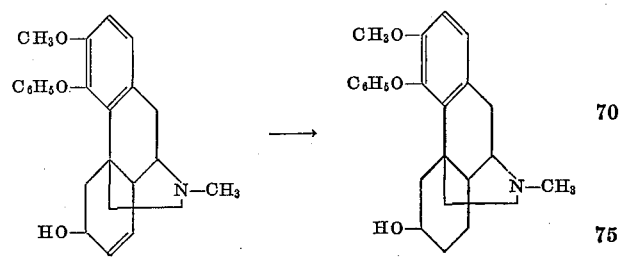

(+) - 3 - methoxy-4-phenyloxy-6β-hydroxy-N-methyl-Δ⁷-morphinan(cis) (200 mg.) is subjected to hydrogenation using platinum dioxide as in Example 6 whereby there is obtained (+) - 3-methoxy-4-phenyloxy - 6β - hydroxy-N-methylmorphinan(cis) (198 mg.) as crystals melting at 136 to 137° C. (crystallized from ether).

The starting material of this example, (+)-3-methoxy-4-phenyloxy-6β-hydroxy-N-methyl-Δ⁷ - morphinan(cis), is prepared from (+) - 3 - methoxy-4-phenyloxy-6-oxo-N-methyl-Δ⁷-morphinan(cis) [cf. Example 9 of this specification] according to the following scheme:

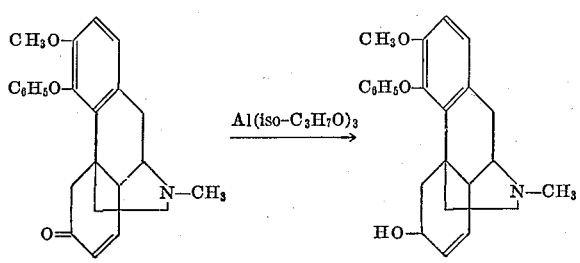

EXAMPLE 11

*Preparation of (—)-3,6β-dihydroxy-N-methylmorphinan(cis)*

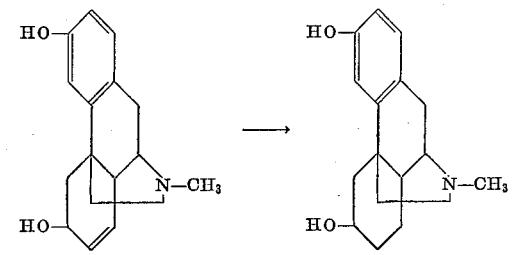

(—)-3,6β-dihydroxy-N-methyl-Δ⁷-morphinan(cis) (32 mg.) is subjected to hydrogenation using platinum dioxide as in Example 6 whereby there is obtained (—)-3,6β-dihydroxy-N-methylmorphinan(cis) (31 mg.) as crystals melting at 243 to 244° C. (crystallized from acetone).

The starting material of this example, (—)-3,6β-dihydroxy-N-methyl-Δ⁷-morphinan(cis), is prepared from (—)-3-methoxy - 6β-hydroxy-N-methyl-Δ⁷-morphina(cis) [cf. Example 5 of this specification] according to the following scheme:

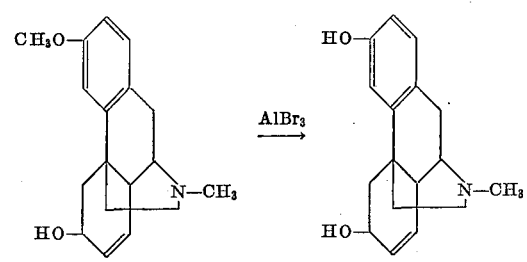

What is claimed is:
1. 3-hydroxy-6-oxo-N-lower alkylmorphinan.
2. (—)-3-hydroxy-6-oxo-N-methylmorphinan(cis).

3. 3-lower alkoxy - 4 - phenyloxy-6β-hydroxy-N-lower alkylmorphinan.

4. (—)-3methoxy-4-phenyloxy-6β - hydroxy-N-methyl-morphinan(cis).

References Cited by the Examiner

UNITED STATES PATENTS

| 2,974,142 | 3/1961 | Grussner et al. | 260—285 |
| 3,085,091 | 4/1963 | Sawa et al. | 260—285 |
| 3,144,459 | 8/1964 | Sawa et al. | 260—285 |

FOREIGN PATENTS 761,974  11/1956  Great Britain.

OTHER REFERENCES

Bentley, Chemistry of the Morphine Alkaloids, page 28, 338 (1954).

Gates et al., J. Am. Chem. Soc., vol. 78, pp. 1380–1393 (1956).

Gates et al., J. Am. Chem. Soc., vol. 80, page 1186 (1958).

Hartung, Ind. Eng. Chem., vol. 37, pages 126–127 (1945).

NICHOLAS S. RIZZO, *Primary Examiner.*

DON M. KERR, DONALD G. DAUS,
*Assistant Examiners.*